United States Patent [15] 3,651,270
Lee, Jr. et al. [45] Mar. 21, 1972

[54] MESSAGE WAITING AND DO-NOT-DISTURB ARRANGEMENT

[72] Inventors: Ernest O. Lee, Jr.; John A. Adams, Jr.; Ignas Budrys, all of Fairport, N.Y.

[73] Assignee: Stromberg-Carlson Corporation, Rochester, N.Y.

[22] Filed: Oct. 26, 1970

[21] Appl. No.: 84,082

[52] U.S. Cl. ..................... 179/18 B, 179/84
[51] Int. Cl. ..................... H04m 3/42
[58] Field of Search ..................... 179/18 BG, 18 B, 84 B, 84 L

[56] References Cited

UNITED STATES PATENTS 3,472,968 10/1969 Jacobaeus et al ..................... 179/18 BG
3,508,011 4/1970 Dehlen et al. ..................... 179/84 L X

*Primary Examiner*—William C. Cooper
*Attorney*—Craig, Antonelli, Stewart & Hill

[57] ABSTRACT

A PBX telephone system, particularly adapted for hotel and motel use, includes a message-waiting and a do-not-disturb arrangement. A lamp is mounted at the telephone in each hotel room, and is controlled by logic and storage circuitry which receives signals from the attendant's register and turret. To place a line in a particular mode, either do-not-disturb or message-waiting the attendant merely depresses a respective key on her turret and dials the line number. The lamp will flash on and off for a message-waiting indication and steadily for a do-not-disturb indication. During either mode the telephone may be used to place outgoing calls.

23 Claims, 3 Drawing Figures

INVENTORS
ERNEST O. LEE, JR., JOHN A. ADAMS, JR
IGNAS BUDRYS

BY Craig, Antonelli, Stewart & Hill
ATTORNEYS

MESSAGE WAITING AND DO-NOT-DISTURB ARRANGEMENT

The present invention relates in general to telephone systems and more particularly to a message-waiting and do-not-disturb arrangement for use with a PBX telephone system.

At a telephone installation where a large number of lines are handled by an attendant, for example, the room telephones which are handled by a desk clerk at a motel switchboard, certain features are desired which benefit each station and also the attendant supervising calls to be directed to each station from the switchboard. Frequently, at a hotel switchboard, messages are placed which are to be delivered to a guest in one of the hotel rooms. This often necessitates the switchboard attendant calling a particular room and informing the guests that the message is waiting. However, the hotel guests frequently do not wish to be disturbed, especially by the ringing of the phone within the guest's room.

In order to prevent a guest from being disturbed by the ringing of his room phone as a result, for example, of an incoming call, and to permit a switchboard attendant to deliver a signal to a guest's room that a message is waiting, without disturbing the guest, the present invention provides a novel message-wait and do-not-disturb system which provides separate indications of these conditions, by way of a lamp mounted on the telephone in each room, while reducing the complexity of the switchboard through which the message-waiting and do-not-disturb indication signals are delivered to each room.

When the switchboard attendant wishes to inform a guest that a call or message is waiting at the desk, the attendant merely dials the line number of the instrument located in the guest's room and depresses a "message-waiting" key mounted on the attendant's turret. A lamp mounted on the instrument within the guest's room will flash on and off, at a prescribed frequency indicating that a message is waiting. The instrument itself does not ring. If the guest does not wish to be disturbed, the attendant depresses a "do-not-disturb" key and dials the guest's line number. The lamp mounted on the instrument within the guest's room will be continuously energized indicating to the guest that his line is in a do-not-disturb mode. If incoming calls are directed to a line which is in the do-not-disturb mode, a busy signal will be returned or a recorded message arrangement connected to the calling party, whether it be another line located within the hotel telephone system or the switchboard attendant. If the attendant attempts to call a line which has been placed in the do-not-disturb mode, a lamp mounted within the do-not-disturb key will be energized in addition to the return of a busy tone. Thus, the attendant will be notified that the line number is in the do-not-disturb mode, and not merely off-hook.

Of course, even though the attendant may prevent other calls from reaching the line circuit, the placing of the line in a message-waiting or do-not-disturb mode does not prevent calls from originating from the line circuit.

In case of an emergency, where a call must be directed to a line which is in the do-not-disturb mode, an over-ride is provided to enable the attendant to place that call to the line. Upon the termination of the emergency call, the condition of the line automatically reverts back to the do-not-disturb mode.

Furthermore, where an attendant is connected to a line and is talking to a guest, either or both the do-not-disturb or the message-waiting conditions can be applied to or removed from the line to which the attendant is connected, merely by depressing an appropriate key mounted upon the attendant's turret.

Accordingly, it is an object of the present invention to provide a telephone system including a message-waiting and do-not-disturb feature which enables any line handled by a switchboard attendant to receive an indication that a message is waiting and/or that the user of the line does not wish to be disturbed by an incoming call.

It is another object of the present invention to provide a message-waiting circuit for a telephone system wherein the use of a large key panel, which employs a separate key for each line handled by the system is eliminated.

It is a further object of the present invention to provide a telephone system which has a do-not-disturb feature wherein, in the event of an emergency call, the attendant may over-ride the do-not-disturb condition of the line so as to permit the emergency call to be directed to the line.

It is an additional feature of the present invention to provide a combined message-waiting and do-not-disturb arrangement for a telephone system, whereby separate indications for the message-waiting and do-not-disturb modes can be provided at each instrument of each line handled by the switchboard.

It is a further object of the present invention to provide a message-waiting and do-not-disturb arrangement for a telephone system which employs individual storage circuits for each line, so as to eliminate the necessity of employing a cumbersome panel of keys, each key being associated with a particular line, of the attendant's switchboard.

It is still an additional object of the present invention to permit the switchboard attendant to place a line in a do-not-disturb or message-waiting mode while the attendant is connected directly to the line and is talking to the user of the line.

It is still another object of the present invention to provide a message-waiting and do-not-disturb arrangement for a telephone system, whereby the attendant receives an indication in addition to a busy tone, when attempting to be connected with a line which is in the do-not-disturb mode, so that the attendant will be notified that the particular line is in the do-not-disturb mode.

In accordance with one feature of the present invention, a message-waiting and do-not-disturb arrangement is provided for a crossreed PABX telephone system which eliminates the usually encountered key-rack and provides a more versatile arrangement for the attendant, by manipulation of four keys (MW set, MW clear, DND set, DND clear) and station number to place a given station in a message-waiting or do-not-disturb mode.

Each line has a set of flip-flops associated therewith where the message-waiting/do-not-disturb information is stored. The attendant, by keying one of the four keys and the desired station number, may set or clear the flip-flops, thereby placing the station in or taking the station out of the message-waiting or do-not-disturb state, depending upon the particular key which has been operated.

While the attendant is connected to a given station, placing it in a given mode, a matrix path exists from the attendant to the keyed line. Once the flip-flop is set or cleared and the attendant releases, the matrix path is broken and the flip-flop stores the proper information to activate a lamp on the handset and initiate intercept or identify functions.

When a station is placed in a message-waiting mode, the lamp on the telephone flashes at 60 flashes per minute; if the station is placed in a do-not-disturb mode, the lamp is steadily illuminated. The do-not-disturb lamp signal may be over-riden by a message-waiting signal, thereby providing the message-waiting indication at all times.

In the case of an emergency, by keying the do-not-disturb clear key and activating the station number while connected to a trunk, the attendant may over-ride the do-not-disturb condition and ring the line. This over-ride is active only for the single over-ride call and once the attendant releases the station remains in the do-not-disturb mode. To remove the do-not-disturb mode or message-waiting mode, the attendant must operate the appropriate clear key and line number.

Whenever, the attendant keys a line, its state is displayed (i.e., if it is in the do-not-disturb or message-waiting mode), thus the attendant is informed if a line remains in either state for an excessively long period of time.

These and other features, object and advantages of the present invention will become more apparent from the following detailed description thereof, when taken in conjunction with the accompanying drawings, which illustrate one embodiment of the present invention and wherein.

The principles of the present invention are described in detail below in conjunction with an exemplary PBX telephone system of the common control type. Since the present invention is not restricted to use in association with this or any one other particular telephone system, it should be understood that the specific telephone system described herein is presented only for purposes of facilitating an understanding of the basic principles of the present invention. Accordingly, only those detailed features of the disclosed common control system which are important to the operation of the present invention, have been described in detail.

GENERAL SYSTEM DESCRIPTION

Figure 1:
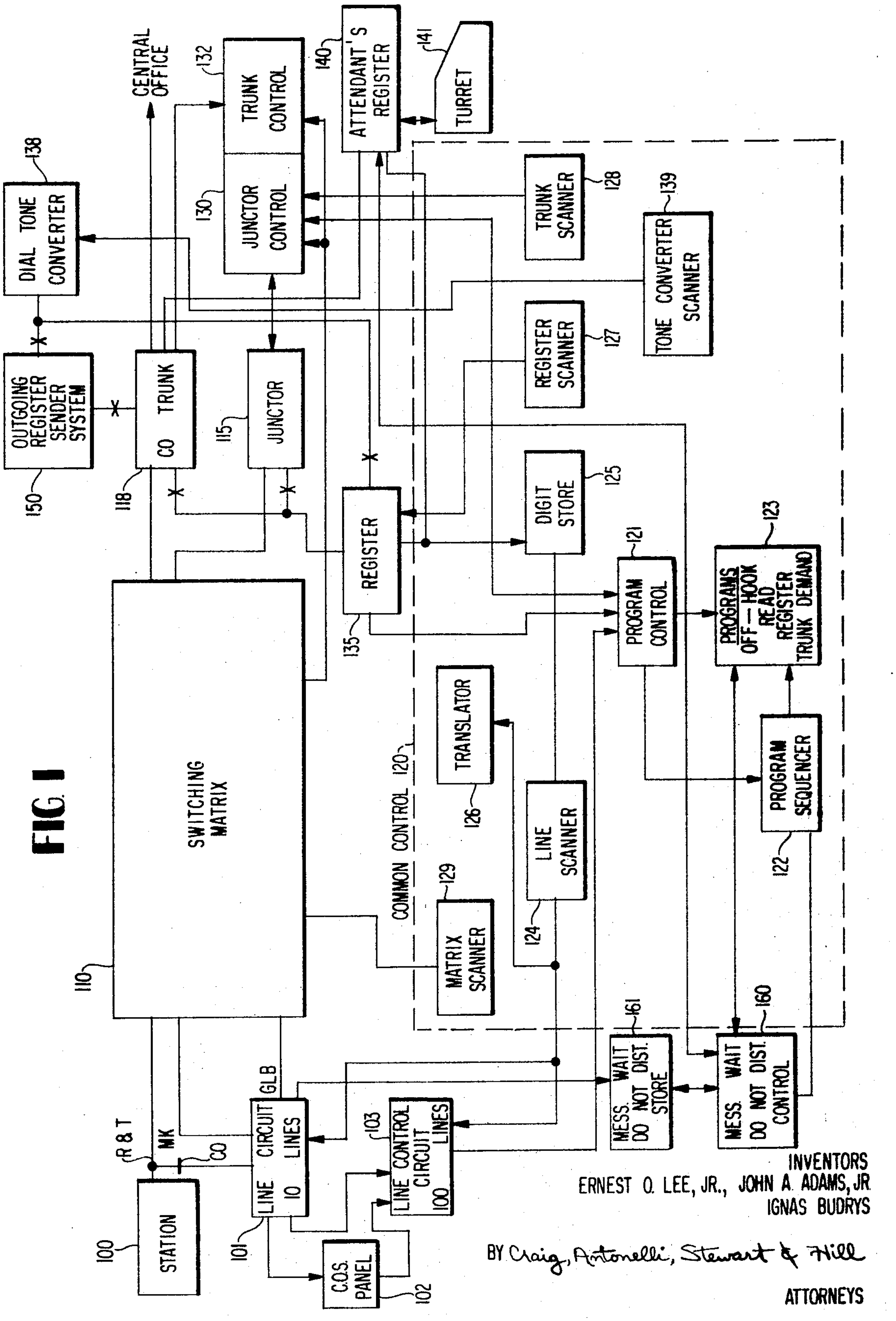
FIG. 1 is a schematic block diagram of a PABX telephone system including the message waiting and do-not-disturb features of the present invention.

FIG. 1 illustrates an over-all block diagram of a common control PBX system capable of connecting one station to another station or to a central office via a trunk circuit under control of the common control circuit. The system provides a plurality of stations 100 (of which only a single station is illustrated in FIG. 1 for purposes of simplicity) with each group of 10 stations 100 being serviced by a line circuit 101 associated with a particular input of the switching matrix 110. The switching matrix 110 is a typical matrix network formed of three stages of reed relay switches providing a plurality of paths between a given input connected to one of the plurality of stations 100 and a given output, connectable to a junctor or a central office trunk 118. All of the switching functions of the system are controlled by the common control circuit 120 which performs the functions for an off-hook program, the read register program and a trunk demand program. One or more junctor controls 130 and trunk controls 132, along with a plurality of registers 135, are also provided for purposes of effecting connection of a particular station requiring service to the common control equipment, so that the operations necessary for the establishment of a communication connection with the PBX or outside thereof to the central office may be performed. A class of service panel 102 is provided for each group of 100 lines and indicates for the respective stations served by the line circuit, special classes of service which are available for the stations and particular equipment which may be available or used thereby, such as tone-dial equipment as opposed to rotary dial.

The common control 120 is divided into several separate functional circuits which serve to control the program of operations carried out to perform the switching process, including the path checking and selection required for connection of a station requesting service to a register or central office trunk. A line control circuit 103 accommodating ten line circuits 101 serves as an interface between the common control 120 and the individual line circuits 101. The common control 120 typically includes a program control 121 which selects the program to be run in order to satisfy a request for service, a program sequencer 122 and a program 123, which implement the program selected by the program control circuit 121. The program control 121 programs sequencer 122 and program circuit 123 may typically take the form of a wired logic or other programmed system of the type well known in the art. The various control signals emanating from this control area of the common control 120 have not been illustrated in detail in FIG. 1 but are shown in the subsequent figures where necessary for an understanding of the operation of the message-waiting and do-not-disturb circuitry of the present invention.

The common control 120 also includes a line scanner 124, which determines the line demanding service on an originating call and identifies and acts as a line marker when terminating a call. A translator 126 is also provided and serves the functions normally associated with a line scanner 124 and the register 135, which is external to the common control, for receiving the digits placed in the register. A register scanner 127 examines the status of the registers and register-senders, in order to determine whether an idle register or an outgoing register sender is available for use in connection with a calling station or defined the register demanding service, in order to complete a call. A trunk scanner 128 and matrix scanner 129 are associated with the path selecting and checking operation performed in connection with the switching matrix 110, the trunk scanner 128 serving the junctors 115 and the central office trunks 118 through the junctor control circuit 130 or trunk control 132, to determine those which may be available to a calling station through the switching matrix 110. The matrix scanner 129 serves to scan the links in the switching matrix 110 in the process of establishing a path from a given calling station through the switching matrix in accordance with a system disclosed in copending application Ser. No. 37,772, filed May 15, 1970, 1970, in the name of Ernest O. Lee, Jr. and assigned to the same assignee as the present application. This copending application also includes a detailed description and illustration of the switching matrix 110 and the various elements including a junctor control 130 and trunk control 132 along with other elements required for the path finding operation. In order to provide attendant service in the system, and attendant's register 140 and turret are connected to the central office trunks 118 and registers 135 to provide service for incoming and outgoing calls. Also associated with the attendant's register and turret is the message-waiting and do-not-disturb circuitry of the present invention.

A message-waiting and do-not-disturb control circuit 160 is associated with the attendant's register 140, the program circuit 123 and the program sequencer 122, located within the common control circuit 120. Connected with the message-waiting and do-not-disturb control circuit 160 is the message-waiting and do-not-disturb storage circuit 161, which is also associated with the line circuits. The operation of the message-waiting and do-not-disturb storage and control circuits 161 and 160, respectively, will be described in detail in connection with FIGS. 2 and 3.

Also associated with the attendant's register, which controls the message-waiting and do-not-disturb operations of the present invention, are the control office trunks 118 which are connectable to outgoing register sender 150.

Typical operation of the system shown in FIG. 1 is initiated by a subscriber at a given station 100 lifting the handset of his telephone, which results in the closing of a direct current loop to the tip T and ring R leads of the line, thereby signaling the associated line circuit 101 of a demand for service. The demand is placed through the associated line control circuit 103 to the common control 120 for an offhook program, and the common control causes the scanner 124 to scan over the lines to identify the particular line requesting service. Upon identifying the line requesting service, the class of service check is made through the COS panel 102 to determine whether the line has a rotary line class of service or a multi-frequency class of service, information which is necessary to determine whether the tone dial converter 138 is necessary for the establishment of a call.

The common control 120 causes the line circuit 101 to place a negative mark on its mark lead, which is connected to an input of the switching matrix 110. The common control 120 then actuates the matrix scanner 129 initiating the path checking and selecting operations, which will select a single path through the switching matrix 110 from the station 100 requesting service. The common control 120 also causes the trunk scanner 129 to scan over the junctors 115 through a junctor control 130 for an idle junctor, and the register scanner 127 to select an idle register. The cross points of the selected matrix path are operated at this time, connecting the calling line through the junctor through the selected register. Dial tone is returned to the calling line from the register through the switching matrix and, at this time, the common control releases and is available to handle additional requests for service. After receiving dial tone, the subscriber dials one or more digits which are received and stored in the register 135. The common control analyzes the digits dialed as they are received to determine whether the call to be established is a local call, an outgoing trunk call or a special request for service.

Figure 2:
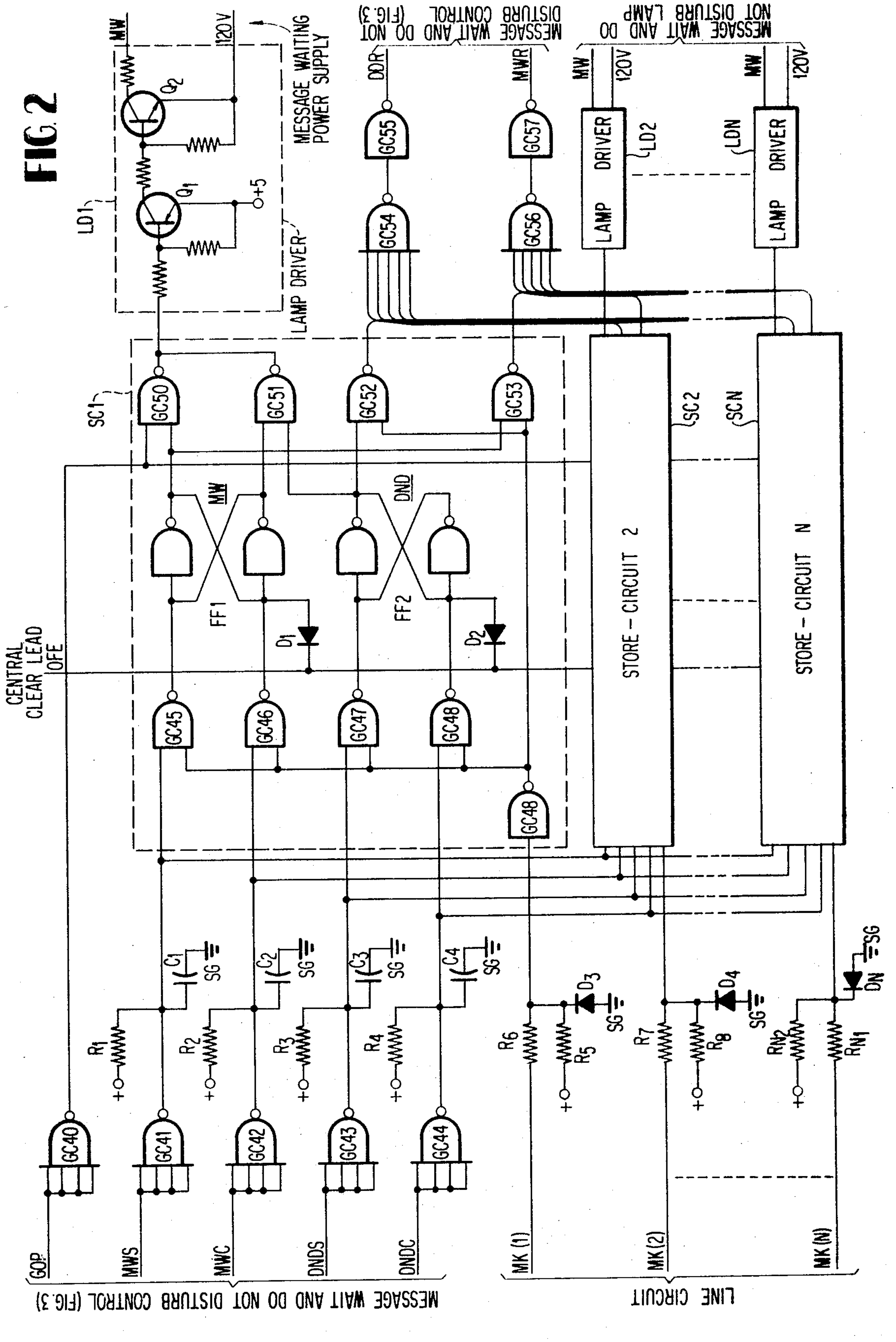
FIG. 2 is a schematic circuit diagram of the message waiting and do-not-disturb storage circuitry.
Figure 3:
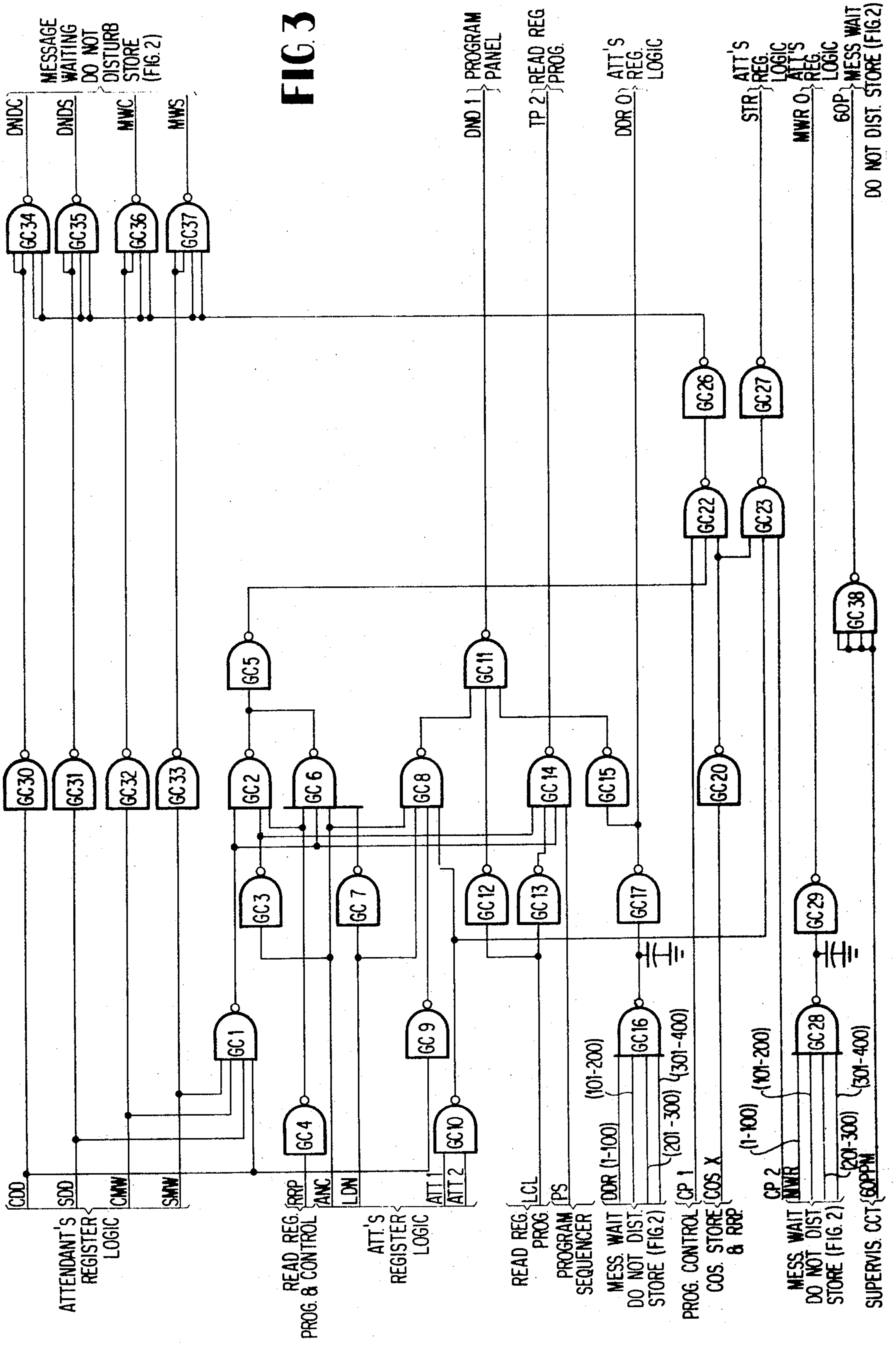
FIG. 3 is a schematic circuit diagram showing the message-waiting and do-not-disturb control circuitry.

In the case where a line is to be placed in a message-waiting or do-not-disturb mode, in accordance with the present invention, the switchboard attendant will depress the appropriate message-waiting and do-not-disturb key and dial the line number via turret 141. After service has been requested from the common control and the class of service check is made, the message-waiting and do-not-disturb control circuitry will deliver a signal to the message-waiting and do-not-disturb store 161 from the attendant's register 140, indicating which key has been depressed by the attendant, so as to specify whether the line circuit is to be placed in do-not-disturb or message-waiting mode. A mark indication from the appropriate line circuit will also be delivered to the message-waiting and do-not-disturb store circuit 161, so as to enable the appropriate storage element therein to store the indication registered by the attendant via the depressed key. At this time, the output of one of the storage element within the message-waiting and do-not-disturb store circuit 161 will be delivered to the lamp on the instrument associated with the marked line circuit. If the attendant has placed the line in the message-waiting mode, a one flash per second signal will illuminate the lamp on the instrument. If the attendant has depressed the do-not-disturb key on the turret 141, a steady illumination signal will be delivered to the lamp on the line instrument. If, once a particular line has been placed in the do-not-disturb mode, an incoming call is directed to that line circuit, a busy signal will be returned to the calling party. However, the attendant may over-ride the do-not-disturb condition so as to enable a calling party to be connected with the line circuit without the return of a busy signal. In addition, the attendant may provide a clear signal to the message-waiting and do-not-disturb store circuit 161, so as to remove all message-waiting and do-not-disturb modes from the lines. Specific details of the message-waiting and do-not-disturb storage and control circuit employed in the present invention are shown in FIGS. 2 and 3 and will be described in more detail hereinafter.

MESSAGE WAITING AND DO-NOT-DISTURB STORE

The message-waiting and do-not-disturb store circuit provides storage for the do-not-disturb or message-waiting modes of operation on a per line basis. This store circuit, shown in FIG. 2, together with the message-waiting and do-not-disturb control circuit, shown in FIG. 3, provides the cross-reed PABX system with the message-waiting and do-not-disturb features.

The message waiting and do-not-disturb store circuitry provides storage circuitry on a per line basis and may be provided on a printed circuit board enabling 20 lines, for example, to be serviced by a single board. In FIG. 2, the following lead designations are employed.

| Lead Designation | Lead Function |
|---|---|
| MWS, MWC, DNDS, DNDC | Clear and set inputs for MW and DND flip-flops |
| MK | Mark Leads at −48 v. when line is marked |
| CFE | Central Clear Lead-Clears MW and TND flip-flops |
| 60P | 60 pulses per minute input signal |
| MW | Message Waiting Lead provides high voltage for message lamp on the telephone |
| 120 v. | −120 v. supply for message lamp |
| MWR | message waiting register low during mark pulse if MW flip-flop is set |
| DDR | do not disturb register low during mark pulse of DND flip-flop is set |

When a line is to be placed in either the message-waiting or do-not-disturb mode, the attendant will depress a set or clear key associated with the message-waiting or do-not-disturb leads. Via the message-waiting and do-not-disturb control circuitry shown in FIG. 3, to be described in more detail hereinafter, a set or clear signal will be present on one of the MWS, MWC, DNDS, or DNDC leads, corresponding to the key which has been depressed by the attendant. Ground, therefore, will be present at the input of one of the gate circuits GC41–GC44. The signal will be inverted and will be delivered to one of the input gates GC45–GC48 contained in each store circuit. A detailed showing of one of the store circuits, i.e., SC1 is presented in FIG. 2 and is surrounded by A dashed lines. The other store circuits, SC2 through SCN are internally identical to the circuitry of the store circuit SC1 and, therefore, only one store circuit has been shown in detail. Connected to the outputs of gate circuits GC41–GC44 are gate circuits GC45–GC48, respectively. The signal which has been inverted by one of the gate circuits GC41–GC44 will prime one of the gates GC45–GC48. Depending upon which line circuit has been dialed by the attendant, one of the mark leads MK (1)–MK (N) will have minus 48 volts placed thereon, which will be clamped to ground through the associated resistor and diode circuitry. Assuming that line MK (1) has been marked, gate circuit GC 49 will deliver an enabling signal to each of the gates GC45–GC48. As a result, a signal will be delivered to set or reset one of the flip-flops FF1 or FF2.

If both flip flops have been originally cleared, via lead CFE, for example, and a signal is delivered through gate circuit GC 45, the MW flip-flop FF1 will be set so as to enable gate circuit GC 50. Because of the 60 pulse per minute signal delivered at the input of gate circuit GC 40, the output of gate circuit GC 50 will switch on and off at the one pulse per second rate. This signal switches the two transistors $Q_1$ and $Q_2$ of the lamp driver circuit LD1 on and off, so as to provide a 120 volt pulsating signal on lead MW at the rate of 60 pulses per minute. Only lamp driver LD1 has been shown in detail, since the other lamp drivers LD2–LDN are internally identical.

Since MW flip-flop FF1 has been set and since the output of gate circuit GC 49 is high, gate circuit GC 53 will be enabled to provide a low at the output of gate circuit GC 57 via gate circuit GC 56. The output of gate circuit 57 will be delivered to the message-waiting and do-not-disturb control circuitry shown in FIG. 3.

If the attendant places the line in the do-not-disturb mode, DND flip-flop FF2 will be set via gate circuit GC 47 and gate circuit GC 43. WIth DND flip-flop FF2 set gate circuit GC 51 will be enabled, thereby forcing the input transistor $Q_1$ to a steady ground, tuning on both transistors, thereby providing a steady 120 volt signal on lead MW. In addition, gate circuit GC 52 will have a ground output during the presence of a MK signal, making the DDR lead low via gate circuits GC 54 and GC 55.

If MW flip-flop FF1 is cleared, the output of gate circuit GC 53 will change from low to high, thereby returning the output of gate circuit GC 57 to a high condition. However, with the outputs of gate circuits GC 51 and gate circuit GC 52 low, a 120 volt signal will remain on lead MW at the output of the lamp driver LD1.

When the attendant wishes to clear all store circuits, the lead CFE goes to ground to reset the flip-flops via diodes $D_1$, $D_2$ etc.

The number of mark leads, store circuits and lamp drivers will, of course, depend upon the number of lines associated with the message-waiting and do-not-disturb storage circuitry of FIG. 2 is shown in FIG. 3.

A message-waiting and do-not-disturb control circuit gates the set and clear signals for message-waiting and do-not-disturb functions and, in addition, provides control signals to the read register program, the program panel and the attendant's register circuits and performs a buffering function. In FIG. 3, the following lead designations are employed:

| Lead Designation | Function of Lead |
|---|---|
| ATT (1), ATT (2) | Ground when common control is connected to attendant's register |
| SMW, CMW, SDD,CDD | Ground when either message-waiting or do-not-disturb mode is to be set or cleared |
| AND | Ground when attendant is not connected |
| RRP | Ground when read register program is in process |
| IDN | Ground when identify program is in process |
| COSX | Low during PS of read register program |
| CP1, CP2 | Clock pulse 1, clock pulse 2 |
| MWS, MWC, DNDS, DNDC | Set and clear signals for message-waiting and do-not-disturb functions; ground when active |
| LCL, PS | Control from read register program and program sequencer |
| DND1 | Ground activates do-not-disturb intercept program |
| STR | Ground provides a stroke pulse to attendant's register |
| MWR, DTR | Ground when message-waiting or do-not-disturb flip-flop is set |
| MWRO, DTRO | O red outputs of MWR and DDR, respectively |
| 60 PPM | 60 pulses per minute signal |
| 60 P | Buffered 60 pulses per minute signal |

Both the message-waiting signal and the do-not-disturb signal are activated by the attendant at the attendant's turret. If the attendant desires to set or clear the MW flip-flop or the DND flip-flop in the store circuit shown in FIG. 2, the appropriate key on the turret will be depressed and the line number will be dialed.

Assuming that the attendant is not connected to a line, one of the inputs to gate circuit GC1 will be low via one of the inputs CCD, SDD, CMW, or SMW. Since the attendant is not connected, a low will appear on line ANC from the attendant's register logic providing a low at the input of gate circuit GC3. Furthermore, since the attendant, by dialing a line number, has started the read-register program, the input to gate circuit GC 4 on line RRP will be low. With the outputs of gate circuits GC1, GC3 and GC4, high, gate circuit GC2 will be enabled and deliver a low to gate circuit GC5. The signal will be inverted by gate circuit GC5 and delivered as one of the inputs to gate circuit GC22.

Since the read register program is running, line COSX from the class of service store and read-register program will be low. This low will be inverted by gate circuit GC20 and delivered as another input to gate circuit GC 22. As clock pulses are delivered on the line CP1, gate circuit GC 22 will be enabled. The output of gate circuit GC 22 is inverted by gate circuit GC 26 and delivered to each of the gate circuits GC34–GC37. Since a low has been delivered to the input of one of the gate GC30–GC33 and inverted thereby, an output signal will appear on one of the lines DND, DNDS, MWC or MWS to be delivered to the message-waiting and do-not-disturb store circuit of FIG. 2. As a result, the appropriate flip-flop will be set or reset.

In response to the setting of the appropriate flip-flop in the store circuit, this information will appear on the leads DTR or MWR connected to the inputs of gate circuits GC 16 and GC 28, respectively. As a result, the appropriate signals are delivered via gates GC 17 or GC 29, respectively through the attendant's register logic via leads DDRO or MWRO, respectively. As soon as the clock pulses CP1 and CP2 invert, gate circuit GC23 is enabled to provide a signal on lead STR, through gate circuits GC 23 and GC 27, which is delivered to the attendant's register and is used to interrogate the information present in the leads MWRO and DDRO.

Furthermore, since the ANC lead is low, gate circuit GC 14 is enabled via gate circuits GC3, GC1 and GC 13, receiving an input signal from the read-register program, and the PS line from the program sequence to indicate to the read register program that the attendant has changed the mode of the message-waiting or do-not-disturb flip-flop for a keyed line and there is no need to continue the program. The read register program will terminate to remove the control from the attendant's register and make all input leads to the message-waiting and do-not-disturb control circuit idle (high).

Where the attendant is not connected through a line, and the attendant wishes to change the message-waiting or do-not-disturb condition (either set or clear), for the line to which she is connected, the attendant depresses the appropriate key on the turret. Depressing one of the MW or DD keys at this time will ground the appropriate MW or DD lead from the attendant's register logic as well as start the identity program, which will make lead IDN low. A low on one of the leads CDD-SMW. i.e., one of the MW or DD leads, together with a low on the IDN lead and one of the RRP leads, will make all four inputs to gate circuit GC 6 high, which in turn, will make the output of gate circuit GC5 high. The lead ANC is high, of course, since the attendant is connected. Again, as was discussed in the previous paragraphs, with inputs on lines COSX and the appropriate clock pulses, the gating signals are delivered to the store circuit, via gate circuits GC 34–GC 37, to set and clear the appropriate flip-flops.

When the attendant answers an incoming call on the attendant's trunk, the identify program is run. At this time, the IDN lead is at ground and one of the leads ATT (1), ATT (2) is low, also. With one of the latter leads being low, the output of gate circuit GC 10 will be high. The low on the IDN lead is not sufficient to enable gate circuit GC 5. However, the low on one of the ATT leads, when inverted by gate circuit GC 10, will be sufficient to enable gate circuit GC 23 to provide an output signal on lead STR during the presence of signals on leads COSX and CP 2. As a result, there is no transfer of set or clear signals during this operation and the only function served is the provision of a STR signal, which is employed to enable the reading out of information stored in the MW or DND flip-flops in the message-waiting and do-not-disturb store circuit shown in FIG. 2.

When the attendant extends a call to a line, the identify program will run automatically, making the lead IDN low, which together with one of the ATT leads, will satisfy the conditions of the gates described in the above paragraphs so as to produce a low on lead STR. The attendant's call will either go through or, if the line has been placed in the do-not-disturb mode, busy signal will be turned and the call be blocked. The state of the MW and DND flip-flops will be displayed at the attendant's turret via lamps on the key board so as to inform the attendant that the return of a busy signal is due to the do-not-disturb mode of the line circuit.

When a line circuit is in the do-not-disturb mode and the attendant wishes to over-ride this mode in the case of an emergency, she will depress the CDD switch and key the line number. The CDD input of gate circuit GC1 will be low and, via gate circuit GC 9, together with the output of gate circuit GC10, the high on lead ANC and on lead IDN will enable gate circuit GC8, so as to make its output low. Since the lead ANC is high, the output of gate circuit GC3 will be low, so as to disable gate GC2 and prevent gate GC5 from enabling gate GC22. With gate circuit GC 22 inhibited, the CDD signal will not be passed through gate circuit 34 and, therefore, will not reset the do-not-disturb flip-flop in the message-waiting and do-not-disturb store circuit. In addition, since one of the inputs to gate circuits GC 11 is low, the output lead DND1 will be high, thus removing the interrupt signal and permit the attendant to reach the line even though it is in the do-not-disturb mode. Once the attendant releases, however, the line will remain in its original do-not-disturb state.

In addition to providing the above control of the message waiting and do-not-disturb conditions, the control circuitry shown in FIG. 3 contains circuitry for "ORING" the MWR and DDR leads via gate circuits GC 28029 and GC 16–17 and routes them to the attendant's register via leads MWRO and DDRO. Furthermore, the 60 PPM signal is distributed via the power gate circuit GC 38 to the message-wait and do-not-disturb store circuit.

We claim:

1. In a PBX telephone system including connections with a group of line circuits, line control circuits, a class of service identification panel for said lines, an attendant's turret for controlling the connection of calls to and from said line circuits, and attendant's register for said turret and a common control circuit for controlling the operation of said system, said system being provided with a message-waiting and do-not-disturb circuit for placing a line in a message-waiting/do-not-disturb mode in response to the activation of control keys providing on said attendant's turret, said message-waiting and do-not-disturb circuit comprising:

first means responsive to a signal from said attendant's turret, representative of the change of state of at least one of said modes for a particular line, for storing said change of state of said line; and second means, dependent upon the particular mode for which a change of state has been stored in said first means, for delivering an indication signal to the telephone of said line indicating that said line has been placed in or removed from at least one of said modes.

2. A PBX telephone system including connections with a group of line circuits, line control circuits, a class of service identification panels for said lines, an attendant's turret for controlling the connection of said calls to and from said line circuits, and attendant's register for said turret and a common control circuit for controlling the operation of said system, said system including a do-not-disturb circuit responsive to do-not-disturb mode signals from said attendant's turret for placing a line circuit in a do-not-disturb mode so as to prevent the telephone of said line circuit from being run in the event of an incoming call and providing an indication of said mode at said telephone while still permitting outgoing calls to originate from said line circuit.

3. A telephone system according to claim 2, further including a message-waiting circuit responsive to message-waiting mode signals from said attendant's turret for placing a line circuit in a message-waiting mode, and providing an indication thereof at said telephone irrespective of the mode of said line circuit previous to the delivery of said message-waiting mode signals.

4. A telephone system according to claim 2, wherein said do-not-disturb circuit comprises a first storage circuit responsive to a do-not-disturb mode indication signal from said attendant's turret and a mark signal from a line circuit keyed at said attendant's turret for storing said do-not-disturb mode signal, whereby said line will remain in said do-not-disturb mode as long as said condition is stored in such storage circuit.

5. A telephone system according to claim 3, wherein said do-not-disturb circuit comprises a first storage circuit responsive to a do-not-disturb mode indication signal from said attendant's turret and a mark signal from a line circuit keyed by said attendant's turret, for storing said do-not-disturb mode indication signal, whereby said line will remain in said do-not-disturb mode as long as said condition is stored in said storage circuit.

6. A telephone system according to claim 5, wherein said message-waiting circuit comprises a second storage circuit responsive to a message-waiting mode indication signal from said attendant's turret and a mark signal from a line circuit keyed by said attendant's turret for storing said message-waiting mode indication signal whereby said line will remain in said message-waiting mode as long as said condition is stored in said storage circuit.

7. A telephone system according to claim 6, wherein the number of said first and second storage circuits is equal to the number of lines serviced in said message-waiting and do-not-disturb modes by said attendant's turret.

8. A telephone system according to claim 7, further including means for clearing, from each of said storage circuits, any message-waiting and do-not-disturb condition signals, stored therein,

9. A telephone system according to claim 8, wherein said first storage circuit comprises a first flip-flop and a first gating circuit connected to the inputs of said flip-flop for receiving said do-not-disturb mode indication signals and said mark signal for gating the storage of said do-not-disturb mode in said flip-flop.

10. A telephone system according to claim 8, wherein said second storage circuit comprises a second flip-flop and a second gating circuit connected to the inputs of said second flip-flop for receiving said message-waiting mode indication signals and said mark signal for gating the storage of said message waiting mode in said second flip-flop.

11. A telephone system according to claim 10, wherein said handset includes a lamp for indicating that the line associated therewith in at least one of said modes and further including first and second lamp drive circuits connected between the respective outputs of said first and second storage circuits and said lamp, whereby a lamp energizing voltage may be delivered to said lamp when the line associated with said telephone is in at least one of said modes.

12. A telephone system according to claim 11, further including a first output gating circuit connected to said first output of said second flip-flop and to a source of periodic signals for gating the energization of said lamp at the frequency of said periodic signals when said line is in said message-waiting mode.

13. A telephone system according to claim 12, further including a second output gating circuit connected to a second output of said second flip-flop and a first output of said first flip-flop for continuously energizing said lamp driver circuit while said line is in only the do-not-disturb mode.

14. A telephone according to claim 6, further including a message-waiting and do-not-disturb control circuit connected to said attendant's register, said common control and said message-waiting and do-not-disturb storage circuits for controlling the delivery of message-waiting and do-not-disturb mode signals from said attendant's turret to said storage circuits.

15. A telephone system according to claim 14, wherein said message-waiting and do-not-disturb control circuit includes a first control logic circuit, responsive to at least one of said mode signals from said attendant's register, said common control circuit and attendant connection signals from attendant's register, for gating said at least one of said mode signals to said storage circuits.

16. A telephone system according to claim 15, wherein said first control logic circuit includes a first control gate circuit, the inputs of which are connected to receive mode signals from said attendant's register, the output of which is connected to one input of a second control gate circuit, the other inputs of said second control circuit being connected to receive an attendant connection signal from said attendant's register and a signal from said common control circuit, for initiating operation of said system, the output of said second control gate circuit being connected to one input of a third control gate circuit, the other inputs of which are gated by said common control circuit, said third control gate circuit having its output connected to a plurality of fourth control gate circuits, which are also connected to receive said mode signals, so as to gate said mode signals to said storage circuits.

17. A telephone system according to claim 16, wherein said first control logic circuit further includes a fifth control gate circuit responsive to a signal from said attendant's register representative of the absence of a connection of said attendant to said line for enabling said second control gate circuit.

18. A telephone system according to claim 16, wherein said message-waiting and do-not-disturb control circuit further includes a second control logic circuit, responsive to a signal representative of the connection between said attendant and a line circuit, at least one of said mode signals from said attendant's register, and a signal from said common control circuit, for gating said at least one of said mode signals to said storage circuits, whereby said attendant may place the line to which said attendant is connected in at least one of said modes.

19. A telephone system according to claim 18, wherein said second control circuit includes a fifth control gate circuit, connected between said third control gate circuit and said attendant's register, for enabling said third control gate circuit, independent of said mode signals.

20. A telephone system according to claim 14, wherein said message-waiting and do-not-disturb control circuit includes an override control logic circuit connected between said attendant's register and said storage circuit, for enabling said attendant to override the do-not-disturb condition of a line, and to extend an incoming call to said line.

21. A telephone system according to claim 20, wherein said override control or logic circuit includes a seventh control gate circuit for receiving a signal representative of said attendant's register being connected to said common control circuit, a do-not-disturb clear signal from said attendant's register, an attendant's connection signal and an identify program signal from said attendant's register, the output of said seventh control gate circuit being connected to an input of an eighth control gate circuit, the other inputs of which are connected to said common control circuit and the do-not-disturb storage circuit, the output of said eighth gate control circuit providing said override signal to permit said attendant to connect said incoming call to said line.

22. A telephone system according to claim 19, wherein said message-waiting and do-not-disturb control circuit includes an override control logic circuit connected between said attendant's register and said storage circuit, for enabling said attendant to override the do-not-disturb condition of a line and to extend an incoming call to said line.

23. A telephone system according to claim 22, wherein said override control logic circuit includes a seventh control gate circuit for receiving a signal representative of said attendant's register being connected to said common control circuit, a do-not-disturb clear signal from said attendant's register, an attendant's connection signal and an identify program signal from said attendant's register, the output of said seventh control gate circuit being connected to an input of an eighth control gate circuit, the other inputs of which are connected to said common control circuit and the do-not-disturb storage circuit, and the output of said eighth control circuit providing said override signal to permit said attendant to connect said incoming call to said line.

* * * * *

UNITED STATES PATENT OFFICE

CERTIFICATE OF CORRECTION

PATENT NO. : 3,651,270
DATED : March 21, 1972
INVENTOR(S) : Ernest O. Lee, Jr., et al.

It is certified that error appears in the above-identified patent and that said Letters Patent are hereby corrected as shown below:

| | |
|---|---|
| Col.8, line 57 | After "call" insert ---will---. |
| Col. 9, line 37 | "panels" should be ---panel---. |
| Col. 10, line 17 | after "said" insert ---first--. |

Signed and Sealed this

*twenty-first* Day of *October 1975*

[SEAL]

*Attest:*

RUTH C. MASON
*Attesting Officer*

C. MARSHALL DANN
*Commissioner of Patents and Trademarks*